(12) United States Patent
Hitz et al.

(10) Patent No.: US 11,240,140 B2
(45) Date of Patent: Feb. 1, 2022

(54) METHOD AND SYSTEM FOR INTERFACING COMMUNICATION NETWORKS

(71) Applicant: Anapaya Systems AG, Zurich (CH)

(72) Inventors: Samuel Hitz, Zurich (CH); Stephen Shirley, Zurich (CH); Sergiu Costea, Zurich (CH)

(73) Assignee: Anapaya Systems AG, Zurich (CH)

( * ) Notice: Subject to any disclaimer, the term of this patent is extended or adjusted under 35 U.S.C. 154(b) by 36 days.

(21) Appl. No.: 16/765,114

(22) PCT Filed: Feb. 15, 2019

(86) PCT No.: PCT/EP2019/053864
§ 371 (c)(1),
(2) Date: May 18, 2020

(87) PCT Pub. No.: WO2019/162210
PCT Pub. Date: Aug. 29, 2019

(65) Prior Publication Data
US 2020/0304399 A1    Sep. 24, 2020

(30) Foreign Application Priority Data

Feb. 20, 2018 (CH) .................................. 00206/18
Mar. 26, 2018 (CH) .................................. 00397/18
Mar. 26, 2018 (CH) .................................. 00399/18

(51) Int. Cl.
*H04L 12/715* (2013.01)
*H04L 12/721* (2013.01)
*H04L 12/725* (2013.01)

(52) U.S. Cl.
CPC ............ *H04L 45/04* (2013.01); *H04L 45/302* (2013.01); *H04L 45/34* (2013.01)

(58) Field of Classification Search
CPC combination set(s) only.
See application file for complete search history.

(56) References Cited

U.S. PATENT DOCUMENTS 6,633,544 B1    10/2003    Rexford et al.
7,151,775 B1    12/2006    Renwick et al.
(Continued)

OTHER PUBLICATIONS

European Patent Office, International Opinion and Search Report, dated Aug. 29, 2019, pp. 1-7, P.B. 5818 Patentlaan 2, NL-2280 HV Rijswijk.

*Primary Examiner* — Xavier S Wong
(74) *Attorney, Agent, or Firm* — Davis Wright Tremaine LLP; Gregory Rosenthal

(57) ABSTRACT

The invention is directed to a computer-implemented system and method for transmitting data from a first node to a second node of a source-selected path routing network. In said system and method according to the present invention, a first data packet is received at the first node, wherein said data packet was sent from a source node according to next-hop routing. Subsequently, at least part of the data contained in the data packet is transmitted from the first node to the second node according to source-selected path routing. Finally, the data received at the second node is transmitted to a destination node according to next-hop routing. Said system and method is further characterized by the steps of determining, for at least a subset of a plurality of available paths between the first node and the second node, a plurality of path parameters; determining a plurality of attributes related to the first data packet; selecting a preferred path from the plurality of available paths based on a decision rule, said decision rule specifying, for at least one attribute, a preferred range of path parameters; and remotely determining the second node based on destination information related to the destination node, wherein said destination information is extracted from the data packet.

24 Claims, 4 Drawing Sheets

(56) References Cited

U.S. PATENT DOCUMENTS

| | | | |
|---|---|---|---|
| 7,751,331 B1 | 7/2010 | Blair et al. | |
| 7,752,332 B2 | 7/2010 | Jiang et al. | |
| 8,897,141 B2 | 11/2014 | Liu et al. | |
| 2005/0207411 A1* | 9/2005 | Ota | H04L 69/16 370/389 |
| 2007/0002740 A1* | 1/2007 | Evans | H04L 45/302 370/230.1 |
| 2009/0245243 A1 | 10/2009 | Rangarajan et al. | |
| 2010/0309795 A1 | 12/2010 | Shah et al. | |
| 2013/0188493 A1 | 7/2013 | Numata | |
| 2014/0129735 A1 | 5/2014 | Thyni et al. | |
| 2014/0362705 A1* | 12/2014 | Pan | H04L 45/00 370/237 |
| 2016/0065449 A1 | 3/2016 | Pani et al. | |
| 2018/0176090 A1* | 6/2018 | Lessmann | H04L 45/02 |
| 2018/0227212 A1* | 8/2018 | Ferguson | H04L 45/22 |

* cited by examiner

METHOD AND SYSTEM FOR INTERFACING COMMUNICATION NETWORKS

FIELD OF THE INVENTION

The invention pertains to the field of communication networks, in particular computer networks. In particular, it relates to a system and a method for interfacing packet switched networks with networks employing source-selected path routing.

BACKGROUND OF THE INVENTION

Most Internet traffic today consists of Internet Protocol (IP) packets. To send IP traffic, a host first determines an IP address of a given destination, often using a service such as Domain Name Service (DNS). The host then includes the IP address in an IP header section of a data packet and sends the packet to a nearby router. At this point, the host no longer has any control over the path the data packet will take to reach its destination; i.e., the data packet travels through a sequence of routers, each of said routers deciding where to send the packet based on the destination IP address (and possibly other packet contents). Such principle of data packet transport is sometimes referred to as hop-by-hop transport or next-hop transport. Communication networks employing such transport principles are referred to as packet switched networks.

SUMMARY OF THE INVENTION

SCION, as described in the book "SCION: A Secure Internet Architecture", by A. Perrig et al., which is hereby included by reference in its entirety, available at https://www.scion-architecture.net/pdf/SCION-book.pdf (and referred to as the SCION book in what follows; also available as eBook, ISBN 978-3-319-67080-5; and in printed form, ISBN 978-3-319-67079-9), is a next generation Internet architecture with a focus on security and resilience. As opposed to IP networks where only the destination address is needed for forwarding, SCION implements a model called source-selected path routing. In this model, each packet includes the full path—a sequence of router interfaces and Autonomous Systems (ASes)—it must traverse to reach its destination. To send a new packet, a host queries SCION infrastructure services and receives one or more paths. The host then chooses the path it prefers, embeds it in the packet and sends it to a SCION router. Routers then use the path to forward the packet, without needing any lookups.

SCION is fundamentally different from other source-directed route selection architectures, which generally require knowledge about the entire network topology in order to be able to route a data packet along a specific path. In SCION, possible routing paths along which data packets may be sent are initially explored by utilizing path-segment construction beacons (PCBs). During said process referred to as beaconing, PCBs accumulate cryptographically protected path information between autonomous systems (ASes) as they traverse the network. The collected information is chained together to create a data transmission path segment that traverses a sequence of ASes. The path resolution process of SCION creates an end-to-end forwarding path to a destination and consists of a path lookup, where the path segments are obtained and a path combination, where an actual forwarding path is created from the path segments.

As opposed to IP, SCION gives clients control over how traffic is forwarded. This allows clients to choose paths by taking into account security, network performance, and financial cost. Because multiple paths can be used at once, hosts can split traffic based on requirements (e.g., live conferencing traffic across a low-jitter and lower bandwidth path, while low-priority offline backups can be done via a high bandwidth but also high latency path). Hosts can also decide not to split traffic, and thus benefit from the added resilience of multiple paths; if one path becomes unavailable due to network conditions, traffic can still flow across remaining ones.

Due to protocol incompatibilities, existing IP-capable devices cannot directly communicate over SCION. Thus, they cannot leverage the path-control and resilience properties that SCION provides. However, it is possible to provide these advantages via tunneling devices called SIGs (SCION-IP Gateways as described briefly in paragraph 10.3 of the SCION book), which encapsulate IP packets in SCION packets. Because a SIG is SCION-capable, it handles path selection for encapsulated traffic (usually according to some forwarding policy) without requiring any changes to IP hosts or routers.

Hence, the SCION-IP gateway (SIG) service is responsible for providing interoperability between SCION and the legacy IP world. Every SCION AS that wants to enable legacy IP connectivity between its legacy hosts and those in other ASes deploys a SIG service. The service takes care of routing and encapsulation of legacy inter-AS traffic. All legacy traffic between SCION ASes is handled by the SIG service, with the sending side encapsulating the traffic, and the receiving side decapsulating it again back into regular IP packets.

All legacy traffic into or out of a SCION AS goes through the SIG service, by means of legacy IP routing rules. This means that the SIG service must be fast, in order to keep up with the traffic flow. It must also be robust, and able to deal with any packet loss in the encapsulated traffic.

Nevertheless, the question remains how these SIGs may ideally be employed and/or set up to allow for optimum tunneling performance, in particular without complicated tuning and/or user interaction.

It is thus an objective of the present invention to provide a method and a device for interfacing packet switched networks with networks employing source-selected path routing.

This objective and other objectives are solved by a method and a device for transmitting data from a first node to a second node of a source-selected path routing network in accordance with the independent patent claims. Preferred embodiments are defined by the dependent claims.

In the following a summary is provided to introduce a selection of representative concepts in a simplified form that are further described below in the detailed description. This summary is not intended to identify key features or essential features of the claimed subject matter, nor is it intended to be used in any way that would limit the scope of the appended claims.

The subject matter of the present invention is directed to a computer-implemented method for transmitting data from a first node to a second node of a source-selected path routing network. In a first step of said method according to the present invention, a first data packet is received at the first node, wherein said data packet was sent from a source node according to next-hop routing. Subsequently, at least part of the data contained in the data packet is transmitted from the first node to the second node according to source-selected path routing. Finally, the data received at the second node is transmitted to a destination node according to next-hop routing. Said method is further characterized by the steps of determining, for at least a subset of a plurality of available paths between the first node and the second node, a plurality of path parameters; determining a plurality of attributes related to the first data packet; and selecting a preferred path from the plurality of available paths based on a decision rule, said decision rule specifying, for at least one attribute, a preferred range of path parameters.

In the method according to the present invention, the first node constitutes an entry gateway between a first subnet of a packet switched network or a first packet switched network and the source-selected path routing network and the second node constitutes an exit gateway between the source-selected path routing network and a second subnet of the packet switched network or a second packet switched network.

Hereby, the first subnet is different from the second subnet, and/or the first packet switched network is different from the second packet switched network.

While the first node and the source node belong to the first subnet of a packet switched network or to the first packet switched network, the second node and the destination node belong to the second subnet of the packet switched network or to the second packet switched network.

Further, in the method according to the present invention, the plurality of attributes related to the first data packet is determined from a header of said first data packet using deep inspection.

Said plurality of attributes related to the first data packet comprises a traffic class and/or a source and/or destination application. Examples for traffic classes are audio or video data, VoIP data or backup data. However, the present invention is not limited to said examples, but encompasses all different kinds of traffic classes.

Moreover, in the method according to the present invention, determining the plurality of path parameters comprises measurements of network properties for at least a subset of the plurality of available paths.

Hereby, the network properties comprise latency, bandwidth, throughput, jitter, packet loss and/or maximum transmission unit.

In the method according to the present invention, the step of selecting a preferred path from the plurality of available paths based on a decision rule further comprises: determining, for at least a subset of the plurality of available paths, a quantity representative of a deviation between path parameters and the preferred range of path parameters; and selecting the preferred path based on said quantities, in particular by minimizing a sum of said quantities.

Moreover, when selecting a preferred path from the plurality of available paths, pre-determined and/or user-selectable rules based on traffic class, preferred network paths, geographic constraints such as geo-fencing and geo-avoidance, financial cost, network measurements, source and destination application, and traffic shaping rules are taken into account.

The method according to the present invention further comprises the step of determining the second node based on destination information related to the destination node, wherein said destination information is extracted from the data packet.

In one embodiment of the method according to the present invention, the second node is determined by selecting a gateway node that belongs to the second subnet of the packet switched network or to the second packet switched network.

Hence, it is made sure that a second node is selected that is located in rather close vicinity to a specific destination node. Like this, a round-trip time for traffic being transmitted to said specific destination node can be efficiently decreased.

In said embodiment of the method according to the present invention, the second node is determined by selecting a preferred gateway node from a plurality of gateway nodes, wherein each of the plurality of said gateway nodes belong to the second subnet of the packet switched network or the second packet switched network.

Further, in an embodiment of the present invention, the preferred gateway node is selected based on at least one of a plurality of parameters related to said gateway node.

Hereby, said parameters include slices of networks, load on individual destination devices, reachability, measurements of other network properties, sender network and geographical location.

The method according to the present invention further comprises the steps of sending a discovery packet by the first node to the second subnet, in particular to an autonomous system comprising said second subnet; receiving a list of further gateway nodes from the second subnet, in particular from the autonomous system comprising said second subnet; and selecting the preferred gateway node by selecting one of the further gateway nodes from the list.

For each of the further gateway nodes, the list comprises information related to a state of the gateway node.

The list further comprises information related to an instantaneous state of the gateway node, wherein said instantaneous state is characterized by a load of the node and/or a reachability of the node.

The present invention further relates to a data processing device comprising means for carrying out any of the embodiments of the method according to the present invention described above.

In addition, the present invention is directed to a gateway device connectable to a first packet switched network, in particular a first subnet of a packet switched network, wherein said first packet switched network contains a source node, and to a source selected path network at a first node. Said gateway device is further configured to determine a destination node of a data packet received from the source node and to determine a second node. Said second node is connected to the first node through the source selected path network and to a second packet switched network, in particular a second subnet of the packet switched network, wherein said second packet switched network contains the destination node. Finally, the gateway device is configured to transmit the data packet to the destination node according to the method of the present invention described above.

Further, the gateway device according to the present invention is further capable of receiving a stream of data through the source selected path network, preferably from the second node and of extracting data packets for packet switched routing encapsulated in the stream of data. If said data packets are designated for a recipient node, preferably the source node, in the first subnet, the gateway device is capable to transmit said data packets to said recipient node.

Moreover, the gateway device according to the present invention is comprised in the first node and in the second node as well as in general in each of a plurality of gateway nodes.

Further, the present invention relates to a computer program product, in particular to a computer-readable storage medium, which comprises instructions to cause a gateway device to carry out each of the steps of the method according to the present invention.

BRIEF DESCRIPTION OF THE DRAWINGS

The subject matter of the invention will be explained in more detail in the following text with reference to exemplary embodiments, which are illustrated in the attached drawings, of which.

DETAILED DESCRIPTION

Figure 1:
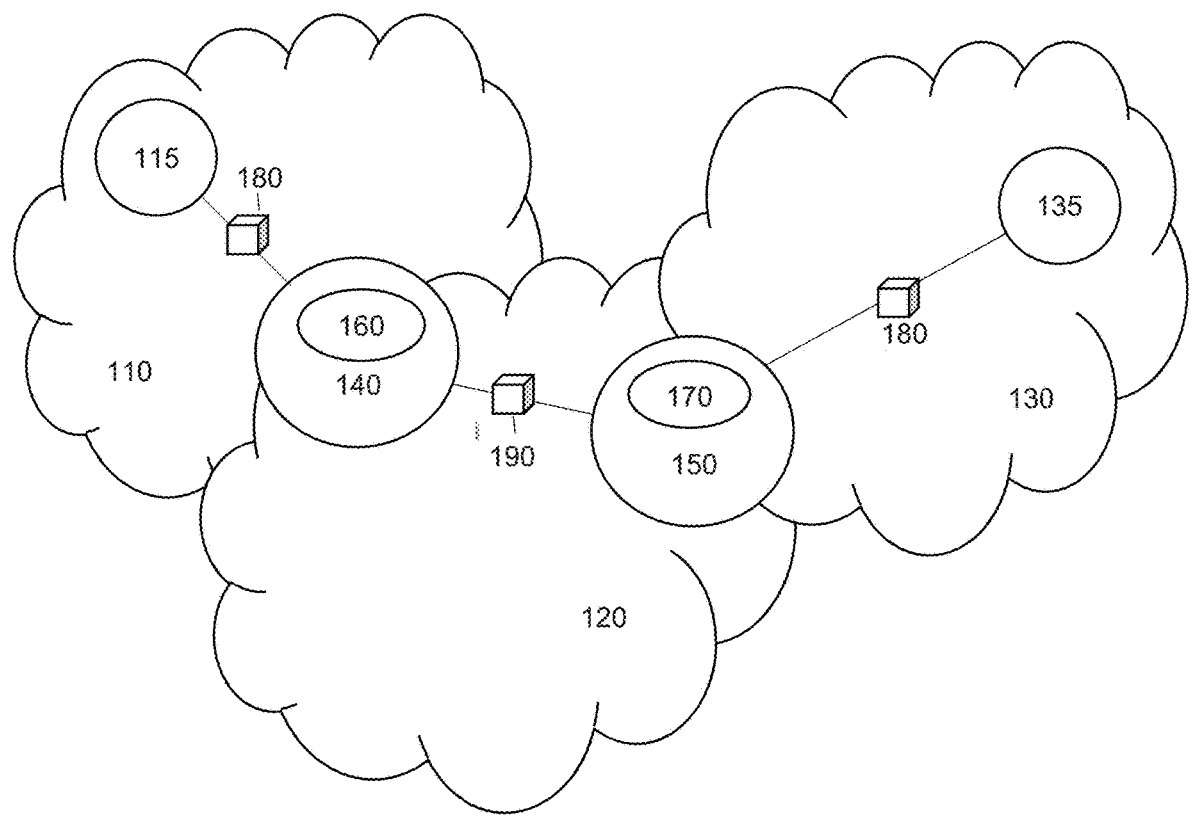
FIG. 1 illustrates a general overview of the system according to the present invention.

FIG. 1 shows the general architecture of a system 100 according to the present invention. Said system comprises a first packet switched network, in particular a first subnet 110, a source-selected path network 120, which is preferably implemented as a SCION network, and a second packet switched network, in particular a second subnet 130. The first subnet 110 of a packet switched network contains a source node 115 and the second subnet 130 of a packet switched network contains a destination node 135. Further, the system 110 comprises a first node 140 and a second node 150.

The first node 140 and the second node 150 are common nodes, in particular edge nodes, of both the source-selected path network 120 and/or the packet switched network, in particular the first 110 and second subnet 130, respectively. Each of the first 140 and second node 150 may, alternatively be thought of as two directly connected edge (sub-)nodes: a first edge (sub-)node 140 of the source-selected path network 120 and a second edge (sub-)node 150 of the packet switched network, in particular the first 110 and second subnet 130, respectively.

The system 100 further comprises at least two gateway devices 160, 170, which are preferably implemented as SIG (SCION-IP Gateway) devices in the present invention. One of said gateway devices 160 is comprised in the first node 140, such that the first node 140 represents the first gateway device 160, while another of said gateway devices 170 is comprised in the second node 150, such that the second node 150 represents the second gateway device 170.

The first gateway device 160 is connectable to the first subnet 110 containing the source node 115 and to the source selected path network 120. Likewise, the second gateway device 170 may be connected to the source selected path network 120 and to the second subnet 130.

Hence, a gateway device, such as the first and second gateway devices 160, 170 may be a device that in general use a SCION network to connect multiple non-SCION networks. In operation, the first gateway device 160 achieve this by encapsulating IP packets, such as IP packet 180, in SCION packets, such as SCION packet 190 corresponding to IP packet 180, and then sending them to their destination via the SCION network 120. When receiving an IP packet 180 from the source node 115, the first node 140, in particular the entry gateway device 160, may look up the destination IP address in a local IP network prefix table and may determine a remote autonomous system (AS), in particular the remote AS containing the destination IP address. Afterwards, the entry gateway device 160 may choose a second gateway device 170, in particular a SIG, in the remote AS as the endpoint in the source-selected path network 120. The traffic may then be encapsulated and sent on the SCION network 120 along one or more paths, depending on a forwarding policy. Subsequently, said chosen second gateway device 170 may act as an exit gateway device, in particular as an exit SIG, at which the SCION packet 190 is again de-encapsulated into an IP packet 180 and then transmitted to the destination node 135 in the second subnet 130 of the packet switched network.

The gateway devices 160, 170 may in particular be a SIG, in particular a prior art SIG which has been modified through software, firmware or hardware.

The gateway devices 160, 170 may, in particular, comprise a processing unit which has been programmed by means of software or firmware, in particular loaded and/or stored in a memory associated with, in particular connected to, or comprised by said processing unit such that the processing unit may access data in said memory, to execute any of the methods as described above or below.

Gateway devices 160, 170 as described above may communicate with each other over the SCION network, using paths constructed by SCION services. Multipath communication is supported; if multiple paths exist between two gateway devices 160, 170, they can be used simultaneously, e.g., to distribute different types or classes of traffic over paths with beneficial characteristics for that type or class of traffic.

Depending on network conditions, gateway devices may automatically add and remove paths to a destination without affecting existing traffic. Whenever multiple paths are available, gateway devices 160, 170 may use them to improve traffic resilience. If one path goes down—for example, due to the failure of a transit SCION router—a health monitor comprised by the gateway device 160 notices the event, and the gateway device 160 may remove the path so that traffic may immediately be redirected to remaining paths.

In general, certain paths are better suited to specific types or classes of traffic. Since gateway devices 160, 170 are both IP network and SCION network aware, they may examine traffic to determine its type or class and then send it on the path that fits best. This decision-making process is specified via a forwarding policy, which may e.g. be described by a network administrator in a configuration file or the gateway device. To implement the policy, gateway devices 160, 170 may include a classification engine, which assigns data packets 190 to classes. Data packets 190 in the same class may the temporarily or permanently be sent across the same set of paths, wherein some load-balancing strategy may be applied and use several different paths in an alternating scheme for a single type or class of traffic.

The gateway device forwarding policy may comprise traffic classifiers, which are used to assign a traffic class to data packets (190), path policies, which are used to choose the set of paths for a class, and/or path schedulers, which are used to implement traffic prioritization and shaping.

Figure 2:
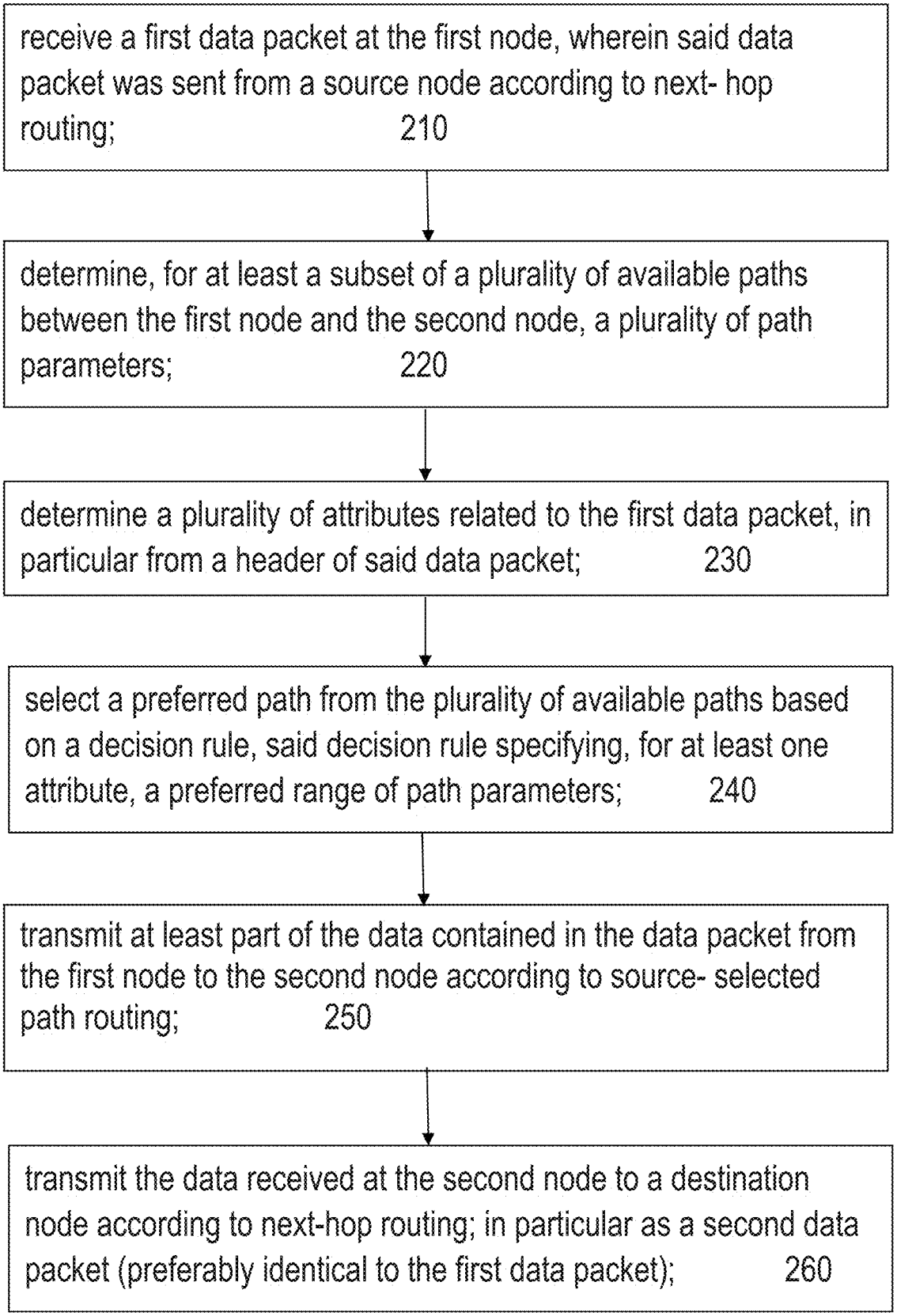
FIG. 2 illustrates a general overview of the system according to the present invention.

FIG. 2 describes a computer-implemented method 200 for transmitting data from a first node 140 to a second node 150 of a source-selected path routing network 120 according to an embodiment of the present invention.

In a first step 210, the first node 140 may receive a data packet 180, in particular an IP packet 180 sent by a source node 115 in the packet switched network, in particular in the first subnet 110 of the packet switched network. The data packet 180 may, in particular, have been sent in accordance with the TCP/IP or UDP/IP protocol, but also in accordance with protocols as SCTP, L2TPv3, IPIP, ICMP, etc., or any other known layer-3 or layer-4 protocol.

To forward IP traffic, the first node 140, in particular the entry gateway device 160, maintains a network prefix table, in particular an IP network prefix table that contains known remote autonomous systems (ASes) and any IP networks within them. This information may either be configured statically, by a network administrator, or may be periodically retrieved by querying SCION services running in the remote AS. Whenever an IP packet 180 is received, the first node 140 uses the prefix table to determine the remote AS to which to send the encapsulated packet 190. This type of functionality is not limited to IP traffic, and the entry gateway device 160 may also include support for other addressing protocols (e.g., MPLS).

As the first 140 and second node 150 are connected through a plurality of paths, a preferred path needs to be selected from said plurality of paths for transmitting the data contained in the data packet 190 to the second node 150.

In order to perform said required selection, a plurality of path parameters representative of properties of the path, in particular data communication related properties of the path, may be determined for each path in step 220 of the computer-implemented method 200.

In a next step 230 of the method 200 according to an embodiment of the present invention, a plurality of attributes related to, in particular characterizing, the first data packet 190 may be determined, in particular from information contained and/or provided in a header of said data packet 190.

In particular, a traffic class of the first data packet 190 may be determined as an exemplary attribute. A traffic class may be thought of as a set of packets that match a predefined set of conditions. Such conditions usually refer to protocol fields, e.g. a specific destination port or a specific source IP address. Gateway devices 160, 170 assign a class to traffic by evaluating the conditions on each packet received from non-SCION networks; usually, this is IP traffic but support for other protocols may be added (such as MPLS). Depending on policy, Gateway devices 160, 170 may evaluate conditions across an entire network stack: network layer (IPv4, IPv6, etc.), transport layer (TCP, UDP, AH, ESP, etc.), and application layer via deep packet inspection (HTTP, DNS, etc.).

For deep packet inspection, support for specific applications may be added to gateway devices 160, 170 via modules. The modules may tell the gateway devices 160, 170 how to parse application messages and, in the case of more complex applications, may also include instructions on how to track state, in particular a network state or a state of a specific connection, in particular a traffic flow, in particular between two specific nodes. This allows the gateway devices 160, 170, such as SIGs, to implement advanced quality-of-service policies (e.g., assigning a low-jitter class to web conferencing traffic) even when lower-layer protocols do not include any relevant information.

Subsequently, in step 240 of the method 200, a preferred path is selected from the plurality of available paths. Said selection may be carried out based on a decision rule, which decision rule may, in particular, specify, for at least one attribute, a preferred range of path parameters.

For each traffic class and each destination AS, the entry gateway 160 may select a set of paths out of a pool of all known paths. The decision rule may be based on a configured path policy, which may dictate parameters that a selected path should or must have. For example, a voice traffic class might prefer paths with low latency. To choose paths efficiently, the entry gateway 160 has access to multiple path parameters. When discovering a new path, the entry gateway 160 may receive information about a maximum allowed packet size (Maximum Transmission Unit, or MTU) for said new path. Information about bandwidth might also be available.

Additionally, the first node 140, in particular the entry gateway device 160, may permanently, in particular at least essentially constantly monitor path health, e.g. by passively gathering statistics about traffic and/or by actively exchanging health check packets. Thus, the first node 140 may calculate parameters such as loss, latency, and jitter for each path. Other useful properties are not strictly related to networking; these may include geographical location of transit ASes, ownership of transit ASes, or financial costs of using a path (e.g., if transit ASes monetize forwarding).

Returning to FIG. 2, once a preferred path has been selected from the plurality of available paths based on the decision rule, in step 250, at least part of the data contained in the data packet 180, preferably however the whole data packet 180 as received by the first node 140, may then be transmitted, in particular sent, to the second node 150 according to source-selected path routing, as, in particular, provided for by a SCION network 120.

Finally, in step 260 of the method 200 according to an embodiment of the present invention, the data packet 190, which is received at the second node 150, is de-encapsulated by the exit gateway device 170 and transmitted to the destination node 135 as a second IP-data packet according to next-hop routing. Preferably, said second IP data packet is identical to the first IP data packet 180.

In a further aspect of the present invention, the first node 140, in particular the entry gateway 160, may implement advanced quality-of-service mechanisms in the form of traffic prioritization and shaping, after a set of paths is selected.

The first node 140 may shape traffic on a path by only allowing a preset amount of traffic, in particular traffic in a given class, to be forwarded over a period of time. Traffic that exceeds the threshold may be dropped.

If the same path (or paths) is selected for multiple traffic classes and a bandwidth of the path is insufficient, the first node 140 can prioritize traffic based on said traffic's class. Packets from classes that are deemed prioritary are put on the path before others. If full path capacity is reached, packets are dropped. Prioritization policies can also configure caps (absolute limits or limits relative to available bandwidth) on how much traffic from a class can be sent across a path, or if a particular class can send above its allocation (also known as burst) if bandwidth is available, i.e. if the first node may send traffic and or packets belonging to said class at transmission rates that will lead to an allocated bandwidth for said particular class to be exceeded.

Figure 3:
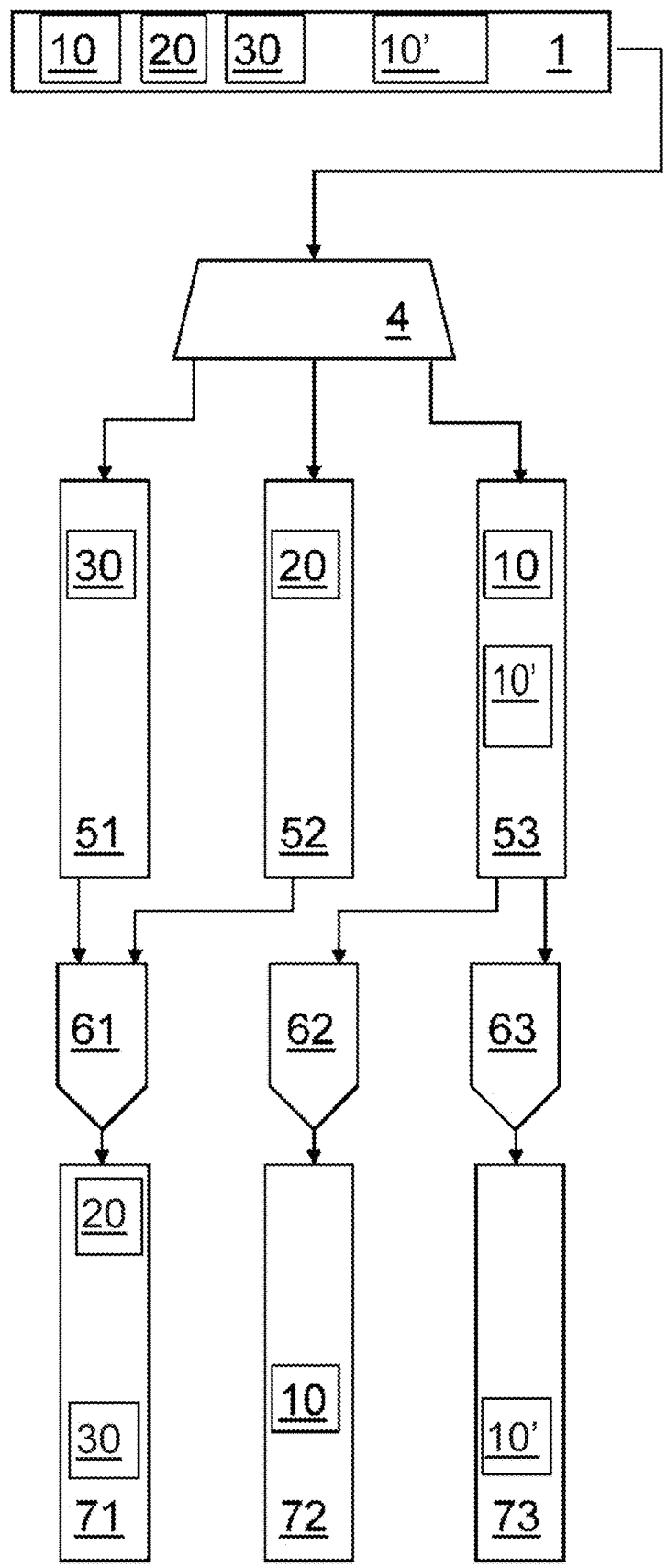
FIG. 3 illustrates a forwarding policy engine of a gateway device in accordance with the present invention.

FIG. 3 illustrates a forwarding policy engine 300 of a gateway device 160 in accordance with the present invention. IP data packets 10, 10', 20 and 30, originating from one or more source nodes 115 of an IP network 110, arrive at a first node 140, in particular an entry gateway device 160, through an input packet queue 1 of said first node 140.

A traffic classifier 4 comprised by the gateway device 160 inspects IP data packages 10, 10', 20 and 30 and classifies them into three different and disjoint classes based on, in particular, content of the IP data packets 10, 10', 20 and 30.

As exemplary illustrated in FIG. 3, IP data packets 10, 10' may contain voice data and may thus accordingly be classified into voice data class 53. IP packet 20 may contain backup data and may thus accordingly be classified into backup data class 52. IP packet 30 may contain strictly confidential data and may thus accordingly be classified into strictly confidential data class 51.

The forwarding policy engine 300 selects appropriate paths for the various data classes 51, 52, 53. First path 71 fulfils the requirements of both backup data class 52 and of strictly confidential data class 51, but not those of voice data class 53. Second path 72 and third path 73 fulfil the requirements for voice data, but not the requirements for backup or strictly confidential data.

The forwarding policy engine 300 may thus decide to send IP data packets 20, 30 belonging to backup data class 52 and of strictly confidential data class 51 along first path 71, and IP data packets belonging to voice data class 53 along second path 72 or third path 73. Schedulers 61, 62, and 63 subsequently distribute the various IP data packets 20, 30, 10 and 10' according to the decision of the forwarding policy engine 300. In the example shown in FIG. 3, the forwarding policy engine 300 decided to send IP data packets 10, 10' in parallel on second path 72 and third path 73, e.g. in order to limit bandwidth consumption on the individual paths.

While performing the method 200 of the present invention described above, the first node 140 may constantly collect information about the paths being used to determine if a path is up (i.e., may be used to send traffic) and to compute some of the parameters that can be used in path policies by the forwarding policy engine 300 described with reference to FIG. 3.

While some of this information may be derived from passive traffic—for example, counting the number of dropped frames when the first node 140 is receiving traffic—the first node 140 may also take an active role in measuring some parameters. Periodic probes may be sent out across each path; if a probe is unanswered by a remote receiving node 150, in particular gateway device 170, a failure is recorded. If multiple consecutive probes are lost, the path is marked as down and the first node 140 may attempt to switch encapsulated traffic to a different path.

Figure 4:
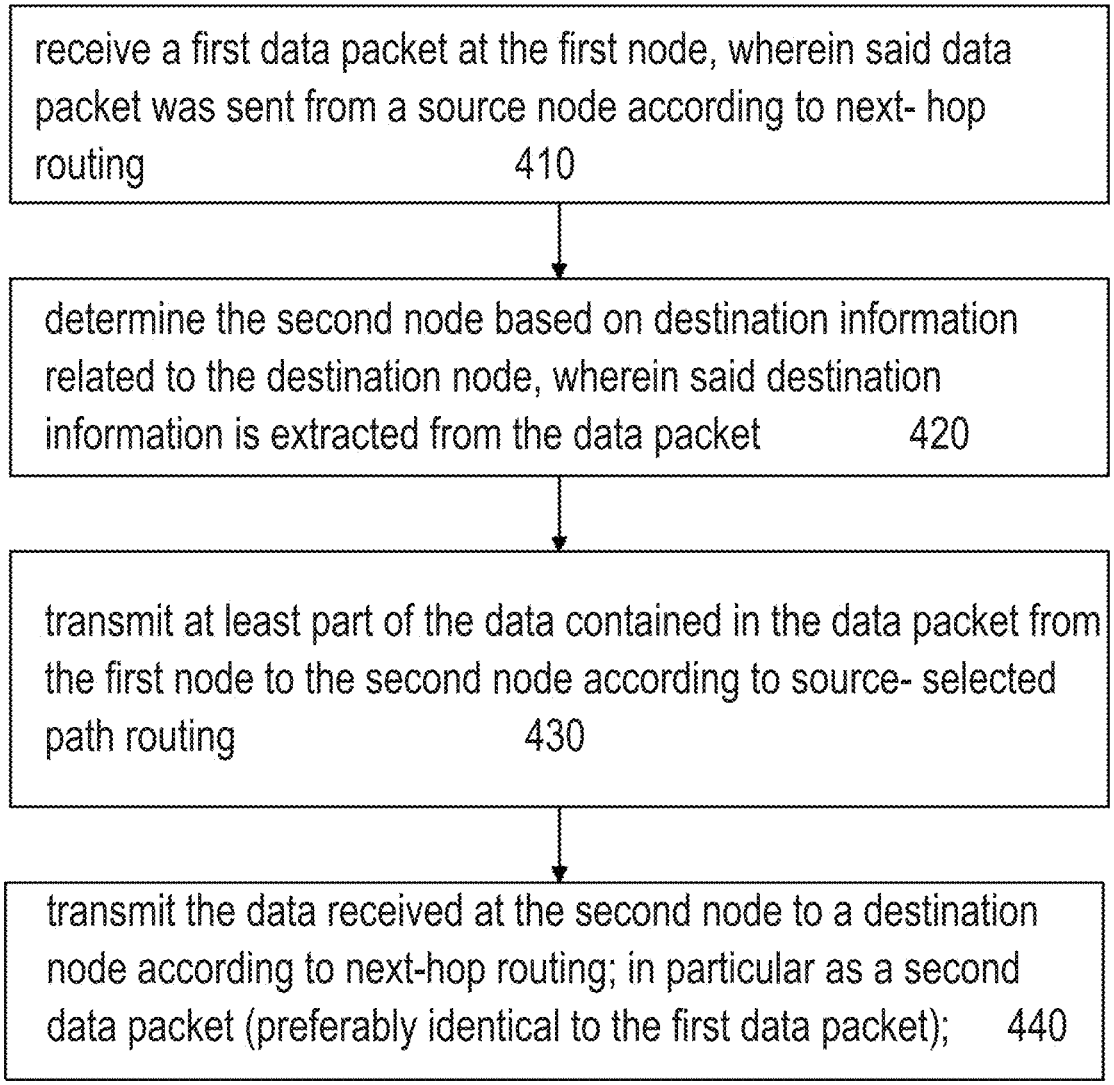
FIG. 4 illustrates a second exemplary embodiment of the method in accordance with the present invention.

FIG. 4 describes a further computer-implemented method 400 for transmitting data from a first node 140 to a second node 150 of a source-selected path routing network 120 according to an embodiment of the present invention.

In a first step 410, the first node 140 may receive a first data packet 180, in particular an IP packet 180 sent by a source node 115 in the packet switched network, in particular in the first subnet 110 of the packet switched network, according to next-hop routing.

To send traffic to a remote AS, the first node 140, in particular the entry gateway 160, must discover a remote node of the source-selected path routing network 120 capable of recovering the first data packet 190, and of transmitting said first data packet 190 to the destination node 135. The remote node, which is to serve as second node 150 for at least the first data packet 190, may, in particular, be a SIG which may act as exit gateway device. Similarly to a network prefix table, a list of such remote nodes, in particular SIGs, may either be configured statically, or may be requested from the remote AS. The first node 140 may send the requests, e.g. on startup, if the destination AS, in particular the remote node containing the destination node 135, is included in a configuration file, or on-demand, whenever it needs to send traffic to a remote AS for which it does not know any appropriate remote node. Second nodes 150 discovered on-demand may be deleted if no longer needed (i.e., if no traffic was sent to the remote AS for a preset amount of time); if traffic for the remote AS arrives again, a request is resent so that an appropriate remote node may again be discovered.

Hence, in a next step 420 of the method 400, the second node 150 is determined based on destination information related to the destination node 135. Hereby said destination information is extracted from the data packet 190, which is to be transmitted to the destination node 135.

Alternatively, the remote AS may construct a list of gateway devices 170, in particular SIGs, based on its own traffic policies. For example, if the remote AS sees a request coming from an AS in a specific geographic region, e.g. Asia, it might be interested to include only a gateway device 170 that is close to said geographic region in its answer, thus decreasing round-trip times for encapsulated traffic. The remote AS may also distribute inbound traffic load across multiple gateway devices 170 by repeatedly changing, in particular alternating the list of gateway devices 170 in its answers. More complex traffic policies could respond with high-availability, high-performance gateway devices 170 to selected queries, e.g. from specific remote AS customers. Other factors that are taken into account when creating this list are current load and availability of a gateway device 170. An available gateway device 170 is preferred compared to a non-available one, even if it has a smaller load. Further, also the identity of the source AS is taken into consideration for creating the list, since gateway devices 170 may be exclusive for a set of source ASes, e.g. to implement a Service Level Agreement (SLA) or since a set of said gateway devices 170 may handle public traffic and a different set of said gateway devices 170 may handle traffic from intra-organizational or partner source ASes. If the remote AS responds with a list of gateway devices 170 containing multiple acceptable gateway devices 170, the first node 140 may choose any of them.

The first node 140 may send out probes to determine whether a specific remote gateway device 170 is operational. If a problem with said specific remote gateway device 170 is detected, the first node 140 may choose a new remote gateway device 170 if one is available or issue a new query to the remote AS to obtain the list of available gateway devices 170. If still none are available, based on local policy, the first node 140 may choose to forward traffic to the last known working remote gateway device 170 or drop the traffic.

If the remote gateway device 170 is statically configured or its parent AS is predefined in the configuration file, the probes may be sent out indefinitely. If the AS and remote gateway device 170 were discovered on demand, the probes may only be sent out as long as there is still traffic sent out to the remote AS.

Returning to FIG. 4, when a second node 150 has been determined, at least part of the data contained in the data packet 190 is transmitted from the first node 140 to the second node 150 according to source-selected path routing in the source-selected path network 120 in method step 430.

Finally, in step 440 of the method 400, the data packet 190, which is received at the second node 150, is de-encapsulated by the exit gateway device 170 and transmitted to the destination node 135 as a second IP-data packet according to next-hop routing. Preferably, said second IP data packet is identical to the first IP data packet 180.

Hence, from the description of FIG. 4, it is obvious that the step of determining the second node based on destination information related to the destination node may also be performed independently from performing the steps of determining, for at least a subset of a plurality of available paths between the first node and the second node, a plurality of path parameters, determining a plurality of attributes related to the first data packet, and selecting a preferred path from the plurality of available paths based on a decision rule, said decision rule specifying, for at least one attribute, a preferred range of path parameters.

From the forgoing and further it will be appreciated that, although specific embodiments have been described herein for purposes of illustration, various modifications may be made without deviating from the scope of the present disclosure. The scope of the present invention is limited by the appended claims.

The invention claimed is:

1. A computer-implemented method for transmitting data from a first node to a second node of a source-selected path routing network, comprising the steps of:
   receiving a data packet at the first node, wherein the data packet was sent from a source node according to next-hop routing;
   transmitting at least part of the data contained in the data packet from the first node to the second node according to source-selected path routing;
   transmitting the data received at the second node to a destination node according to next-hop routing;
   determining the second node based on destination information related to the destination node and based on a load and/or a reachability and a geographic location of the second node;
   determining, for at least a subset of a plurality of available paths between the first node and the second node, a plurality of path parameters;
   determining a plurality of attributes related to the data packet; and
   selecting a preferred path from the plurality of available paths based on a decision rule, wherein the decision rule specifies for at least one attribute a preferred range of path parameters,
      wherein the first node constitutes an entry gateway between a first subnet of a packet-switched network or a first packet-switched network and the source-selected path routing network, and wherein the second node constitutes an exit gateway between the source-selected path routing network and a second subnet of the packet-switched network or a second packet-switched network,
      wherein the first subnet is different from the second subnet, and/or the first packet-switched network is different from the second packet-switched network,
      wherein the first node and the source node belong to the first subnet of a packet-switched network or to the first packet-switched network, wherein the second node and the destination node belong to the second subnet of the packet-switched network or to the second packet-switched network,
      wherein the plurality of attributes related to the data packet is determined from a header of the data packet using deep packet inspection,
      wherein the plurality of attributes related to the first data packet comprises a traffic class and/or a source and/or destination application,
      wherein determining the plurality of path parameters comprises measurements of network properties for at least a subset of the plurality of available paths,
      wherein the network properties comprise latency, bandwidth, throughput, jitter, packet loss and/or maximum transmission unit, and
      wherein selecting the preferred path from the plurality of available paths based on a decision rule comprises:
         determining, for at least a subset of the plurality of available paths, a quantity representative of a deviation between path parameters and the preferred range of path parameters; and
         selecting the preferred path based on the quantities by minimizing a sum of the quantities.

2. The computer-implemented method of claim 1, wherein selecting the preferred path from the plurality of available paths based on a decision rule is at least partially based on pre-determined and/or user-selectable rules based on traffic class, preferred network paths, geographic constraints such as geo-fencing and geo-avoidance, financial cost, network measurements, source and destination application, and traffic-shaping rules.

3. The computer-implemented method of claim 2, wherein the destination information related to the destination node is extracted from the data packet.

4. The computer-implemented method of claim 3, wherein the second node is determined by selecting a gateway node that belongs to the second subnet of the packet switched network or to the second packet switched network.

5. The computer-implemented method of claim 4, wherein the second node is determined by selecting a preferred gateway node from a plurality of gateway nodes, wherein each of the plurality of said gateway nodes belongs to the second subnet of the packet-switched network or the second packet-switched network.

6. The computer-implemented method of claim 5, wherein the preferred gateway node is selected based on at least one of a plurality of parameters related to said gateway node.

7. The computer-implemented method of claim 6, wherein said parameters include slices of networks, load on individual destination devices, reachability, measurements of other network properties, sender network, and geographical location.

8. The computer-implemented method of claim 7, further comprising the steps of:
   sending a discovery packet by the first node to the second subnet, wherein the second subnet is associated with an autonomous system comprising the second subnet;
   receiving a list of further gateway nodes from the second subnet; and
   selecting the preferred gateway node by selecting one of the further gateway nodes from the list.

9. The computer-implemented method of claim 8, wherein for each of the further gateway nodes, the list comprises information related to a state of the gateway node.

10. The computer-implemented method of claim 9, wherein the list comprises information related to an instantaneous state of the gateway node, wherein said instantaneous state is characterized by a load of the node and/or a reachability of the node.

11. A gateway device comprising:
   a memory to store operations, and
   a processor or processors to perform the operations, the operations comprising:
   communicate with a first packet-switched network, the first packet-switched network comprising a source node;
   communicate with a sourced-selected path network at a first node;
   determine a second node based on destination information related to a destination node and based on a load and/or a reachability and a geographic location of the second node, said second node connected to the first node through the sourced-selected path network and a second packet-switched network, the second packet-switched network comprising the destination node;
transmit a data packet to the destination node;
determine a plurality of attributes related to the data packet;
select a preferred path from a plurality of available paths based on a decision rule, wherein the decision rule specifies for at least one attribute a preferred range of path parameters,
  wherein the first node constitutes an entry gateway between a first subnet of a packet-switched network or a first packet-switched network and the source-selected path routing network, and wherein the second node constitutes an exit gateway between the source-selected path routing network and a second subnet of the packet-switched network or a second packet-switched network,
  wherein the first subnet is different from the second subnet, and/or the first packet-switched network is different from the second packet-switched network,
  wherein the first node and the source node belong to the first subnet of a packet-switched network or to the first packet-switched network, wherein the second node and the destination node belong to the second subnet of the packet-switched network or to the second packet-switched network,
  wherein the plurality of attributes related to the data packet is determined from a header of the data packet using packet inspection,
  wherein the plurality of attributes related to the data packet comprises a traffic class and/or a source and/or destination application,
determine a plurality of path parameters comprises measurements of network properties for at least a subset of the plurality of available paths, and
  wherein the network properties comprise latency, bandwidth, throughput, jitter, packet loss and/or maximum transmission unit,
select the preferred path from the plurality of available paths based on a decision rule comprises, wherein the decision rule is associated with a quantity representative of a deviation between path parameters and the preferred range of path parameters; and
select the preferred path based on the quantities by minimizing a sum of the quantities.

12. The gateway device of claim 11, wherein the operations further comprise:
receive a stream of data through the source-selected path network;
extract data packets for packet-switched routing encapsulated in the stream of data; and
if the data packets are designated for a recipient node in the first subnet:
  transmit the data packets to the recipient node.

13. The gateway device of claim 11, wherein the gateway device is comprised in the first node and in the second node.

14. The gateway device of claim 13, wherein the gateway device is comprised in each of a plurality of gateway nodes.

15. A non-transitory computer-readable medium storing instructions that when executed by a processor or processors cause a computing system to:
receive a data packet at a first node, wherein the data packet was sent from a source node according to next-hop routing;
transmit at least part of the data contained in the data packet from the first node to a second node according to source-selected path routing;
transmit the data received at the second node to a destination node according to next-hop routing;
determine the second node based on destination information related to the destination node and based on a load and/or a reachability and a geographic location of the second node;
determine, for at least a subset of a plurality of available paths between the first node and the second node, a plurality of path parameters;
determine a plurality of attributes related to the first data packet; and
select a preferred path from the plurality of available paths based on a decision rule, wherein the decision rule specifies a preferred range of path parameters for at least one attribute,
  wherein the first node constitutes an entry gateway between a first subnet of a packet-switched network or a first packet-switched network and the source-selected path routing network, and wherein the second node constitutes an exit gateway between the source-selected path routing network and a second subnet of the packet-switched network or a second packet-switched network,
  wherein the first subnet is different from the second subnet, and/or the first packet-switched network is different from the second packet-switched network,
  wherein the first node and the source node belong to the first subnet of a packet-switched network or to the first packet-switched network, wherein the second node and the destination node belong to the second subnet of the packet-switched network or to the second packet-switched network,
  wherein the plurality of attributes related to the data packet is determined from a header of the data packet using inspection,
  wherein the plurality of attributes related to the first data packet comprises a traffic class and/or a source and/or destination application,
  wherein determining the plurality of path parameters comprises measurements of network properties for at least a subset of the plurality of available paths,
  wherein the network properties comprise latency, bandwidth, throughput, jitter, packet loss and/or maximum transmission unit, and
  wherein selecting the preferred path from the plurality of available paths based on a decision rule comprises:
    determining, for at least a subset of the plurality of available paths, a quantity representative of a deviation between path parameters and the preferred range of path parameters; and
  selecting the preferred path based on the quantities by minimizing a sum of the quantities.

16. The non-transitory computer-readable medium of claim 15, wherein selecting the preferred path from the plurality of available paths based on a decision rule is at least partially based on pre-determined and/or user-selectable rules based on traffic class, preferred network paths, geographic constraints such as geo-fencing and geo-avoidance, financial cost, network measurements, source and destination application, and traffic-shaping rules.

17. The non-transitory computer-readable medium of claim 16, wherein the destination information related to the destination node is extracted from the data packet.

18. The non-transitory computer-readable medium of claim 17, wherein the second node is determined by selecting a gateway node that belongs to the second subnet of the packet-switched network or to the second packet-switched network.

19. The non-transitory computer-readable medium of claim 18, wherein the second node is determined by selecting a preferred gateway node from a plurality of gateway nodes, wherein each of the plurality of said gateway nodes belongs to the second subnet of the packet-switched network or the second packet-switched network.

20. The non-transitory computer-readable medium of claim 19, wherein the preferred gateway node is selected based on at least one of a plurality of parameters related to said gateway node.

21. The non-transitory computer-readable medium of claim 19, wherein said parameters include slices of networks, load on individual destination devices, reachability, measurements of other network properties, sender network, and geographical location.

22. The non-transitory computer-readable medium of claim 19, further comprising the steps of:
sending a discovery packet by the first node to the second subnet, wherein the second subnet is associated with an autonomous system comprising the second subnet;
receiving a list of further gateway nodes from the second subnet; and
selecting the preferred gateway node by selecting one of the further gateway nodes from the list.

23. The non-transitory computer-readable medium of claim 22, wherein for each of the gateway nodes, the list comprises information related to a state of the gateway node.

24. The non-transitory computer-readable medium of claim 22, wherein the list comprises information related to an instantaneous state of the gateway node, wherein said instantaneous state is characterized by a load of the node and/or a reachability of the node.

* * * * *